(12) United States Patent
Wingky et al.

(10) Patent No.: US 8,131,510 B2
(45) Date of Patent: Mar. 6, 2012

(54) RIG CONTROL SYSTEM ARCHITECTURE AND METHOD

(75) Inventors: Mochammad Faisal Wingky, Dubai (AE); Philip Stuart Church, Reigate (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 596 days.

(21) Appl. No.: 12/336,577

(22) Filed: Dec. 17, 2008

(65) Prior Publication Data

US 2010/0147589 A1    Jun. 17, 2010

(51) Int. Cl.
*G06F 19/00* (2006.01)
(52) U.S. Cl. .................................................. 702/188
(58) Field of Classification Search .......... 702/13, 702/14, 182–185, 188
See application file for complete search history.

(56) References Cited

U.S. PATENT DOCUMENTS

| | | |
|---|---|---|
| 6,519,568 B1 | 2/2003 | Harvey et al. |
| 6,629,572 B2 | 10/2003 | Womer et al. |
| 6,944,547 B2 | 9/2005 | Womer et al. |
| 7,026,950 B2 | 4/2006 | Guggari et al. |
| 2003/0063013 A1 | 4/2003 | Jin et al. |
| 2005/0166961 A1 | 8/2005 | Means et al. |
| 2008/0173480 A1 | 7/2008 | Annaiyappa et al. |
| 2010/0147510 A1* | 6/2010 | Kwok et al. ............. 166/250.01 |

FOREIGN PATENT DOCUMENTS

| | | |
|---|---|---|
| CA | 2651075 A1 | 11/2007 |
| GB | 2456232 A | 7/2009 |

OTHER PUBLICATIONS

Deeks, N. R. et al, "WITSML Changing the Face of Real-Time" SPE International, SPE Intelligent Energy Conference and Exhibition, Feb. 25-27, 2008, pp. 1-6, SPE 112016, The Netherlands.
Examination Report of CA serial No. 2686251 dated Sep. 15, 2011.

\* cited by examiner

*Primary Examiner* — Edward Raymond (57) ABSTRACT

The present application discloses a method and framework for drilling rig supervisory control automation that includes replication and aggregation of drilling rig supervisory control panels, a mechanism to manipulate the supervisory control panel parameters using one or more smart algorithms and a method and technique to access the supervisory control panels from a remote location. The system and method further includes recording, editing, and playing back a drilling rig's supervisory control parameter sequence during any typical drilling rig operation. Such a sequence includes recording all of the actions involved in a specific operation of the drilling rig operator. This sequence is saved, and can be edited to optimize the sequence, and further played back on the rig from which it was recorded, or on any other rig in the network.

21 Claims, 9 Drawing Sheets

RIG CONTROL SYSTEM ARCHITECTURE AND METHOD

FIELD

The disclosure relates to the field of oil rig control systems. More particularly, the disclosure relates to a framework and controller for rig supervisory control automation and a method of implementing and operating the same.

BACKGROUND

In current practice, oil and gas operators or drilling contractors utilize a drilling system having numerous drilling rigs in various locations throughout the world. These numerous rigs are oftentimes connected by an intranet or through a secure internet connection. However, remote operation of the rigs from a connected control center or remote console is still difficult due to a number of factors. Oftentimes, when putting together a rig for operation, each subsystem of the rig is manufactured and implemented by a unique vendor. This arrangement creates serious issues and obstacles to implementing remote operation and uniformity to a multiple rig system. For instance, in order for remote operation to occur between the plurality of rigs and a remote control center, the control panels, hardware, and software for each of the multitude of subsystems in each rig would also need to be installed in those remote control centers.

Due to the current drilling supply market situation, it is difficult to standardize the equipment in each rig, as there are not many vendors able to provide all of the subsystems required to operate a single rig on the desired drilling environment. Even when a vendor is capable of providing all the required subsystems to operate a single rig, usually there is some sort of customization still needed to be conducted to operate the rig in the desired environment. Furthermore, drilling is becoming more prolific and expensive, and drill rig personnel is not easily available to man every rig, thus making the need for remote operation greater.

What is greatly needed in the drilling rig field is a method and framework for drilling rig supervisory control automation that allow any smart algorithm to be used to assist, and up to a certain extent, perform the actual supervisory control of the drilling rig directly.

Lastly, efficient practices or operation routines of the supervisory control in any single rig cannot be recorded, modified, saved, and/or played back in that rig or other rigs, or saved at a remote control station for manipulation and use at any rig. Therefore, what is greatly needed in drilling rig is a method and framework for drilling rig supervisory control automation that allows remote operability to every rig in a rig network, and further allows the recording, modification and playback of efficient practices or operation routines in one rig to a multitude of rigs in the rig network.

SUMMARY

The present application discloses a method and framework for drilling rig supervisory control automation that includes replication and aggregation of drilling rig supervisory control panels, a mechanism to manipulate the supervisory control panel parameters using one or more smart algorithms and a method and technique to access the supervisory control panels from a remote location. The system and method further includes recording, editing, and playing back a drilling rig's supervisory control parameter sequence during any typical drilling rig operation. Such a sequence includes recording all of the actions involved in a specific operation of the drilling rig operator. This sequence is saved, and can be edited to optimize the sequence, and further played back on the rig from which it was recorded, or on any other rig in the network.

A rig control system, the system comprising a rig station including a plurality of subsystems, the rig station further including a rig console having a graphical user interface and control for each of the plurality of subsystems, wherein each graphical user interface and control has a unique operating protocol; and a rig control node, the rig control node including a single graphical user interface and control for monitoring and operating the plurality of subsystems with a common operating protocol; a secure network coupled with the rig control node; a remote client station coupled with the secure network wherein the single graphical user interface and control of the rig control node is accessed through the secure network and replicated on the remote client station, such that each substation of the rig can be monitored and operated by a user from the remote client station or the rig control node; a storage medium configured to store a set of executable code; and a processor configured to execute the set of executable code, wherein when the set of code is executed, the monitoring and operation of the system is effectuated.

A method of rig monitoring and supervisory control, the method comprising connecting a rig control node to a secure network; connecting a remote client station to the secure network; replicating a user interface and control for each of a plurality of subsystems of a rig station from a rig console onto a single user interface of the rig control node; accessing the single user interface from the remote client station through the secure network; operating any of the plurality of subsystems by a user from the remote client station; and updating the user interface for each of the plurality of subsystems in response to the operating step.

A method of rig automation control, the method comprising replicating a user interface and control for each of a plurality of subsystems of a rig station from a rig console onto a single user interface of the rig control node; accessing the single user interface from the remote client station through the secure network; recording an instrument sequence conducted by a driller at the rig station; saving the instrument sequence to a recipe list; editing the instrument sequence to optimize the efficiency of the instrument sequence; and playing the instrument sequence back at the rig station.

DETAILED DESCRIPTION OF THE DRAWINGS

Figure 1:
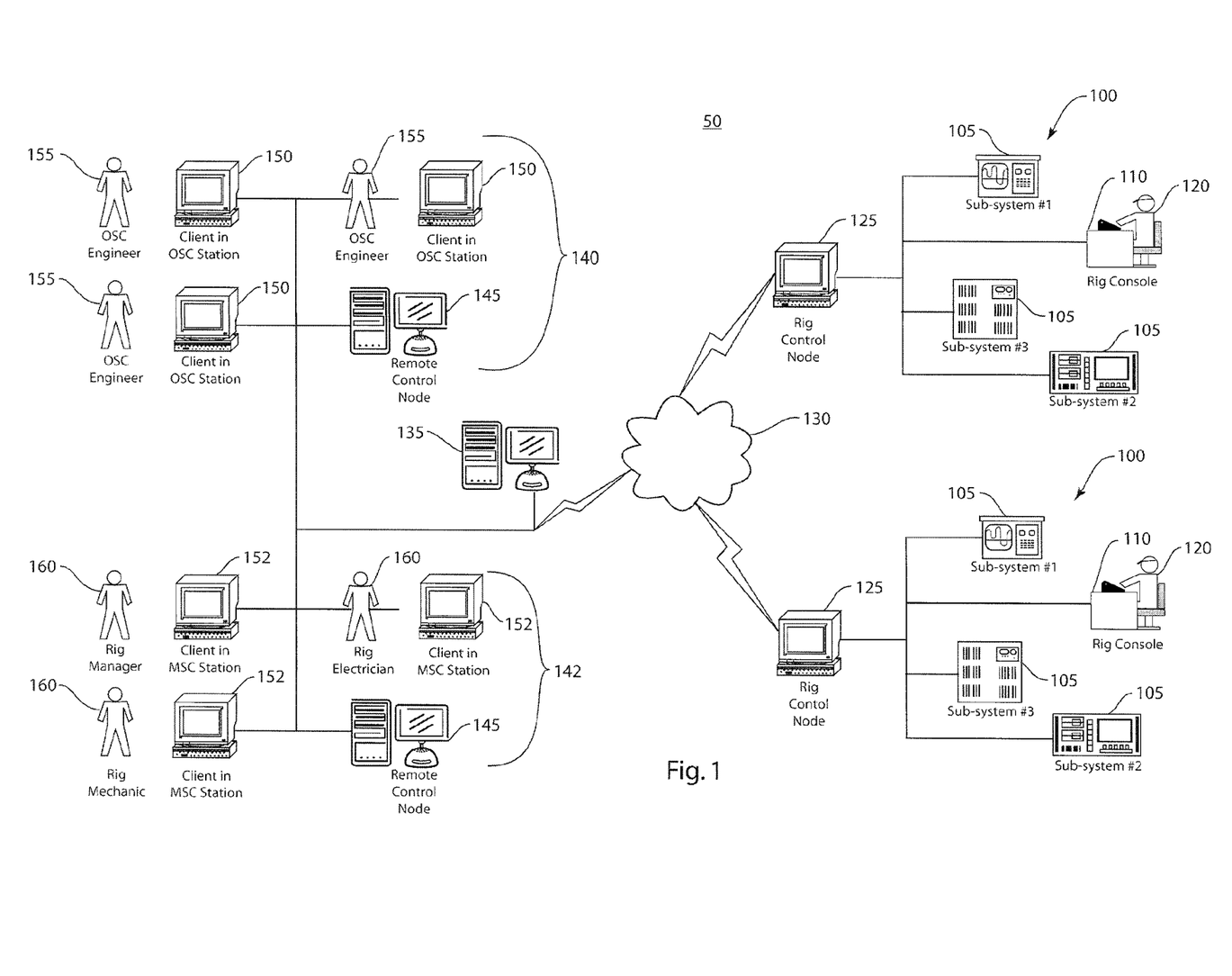
FIG. 1 illustrates an exemplary control system architecture according to an embodiment of the present application.

An embodiment of the rig control system architecture 50 of the present application is depicted in FIG. 1. This architecture 50 includes a number of rig stations 100 connected with a network 130 through rig control nodes 125. An exemplary rig station 100 is depicted in FIG. 2 as well.

Figure 2:
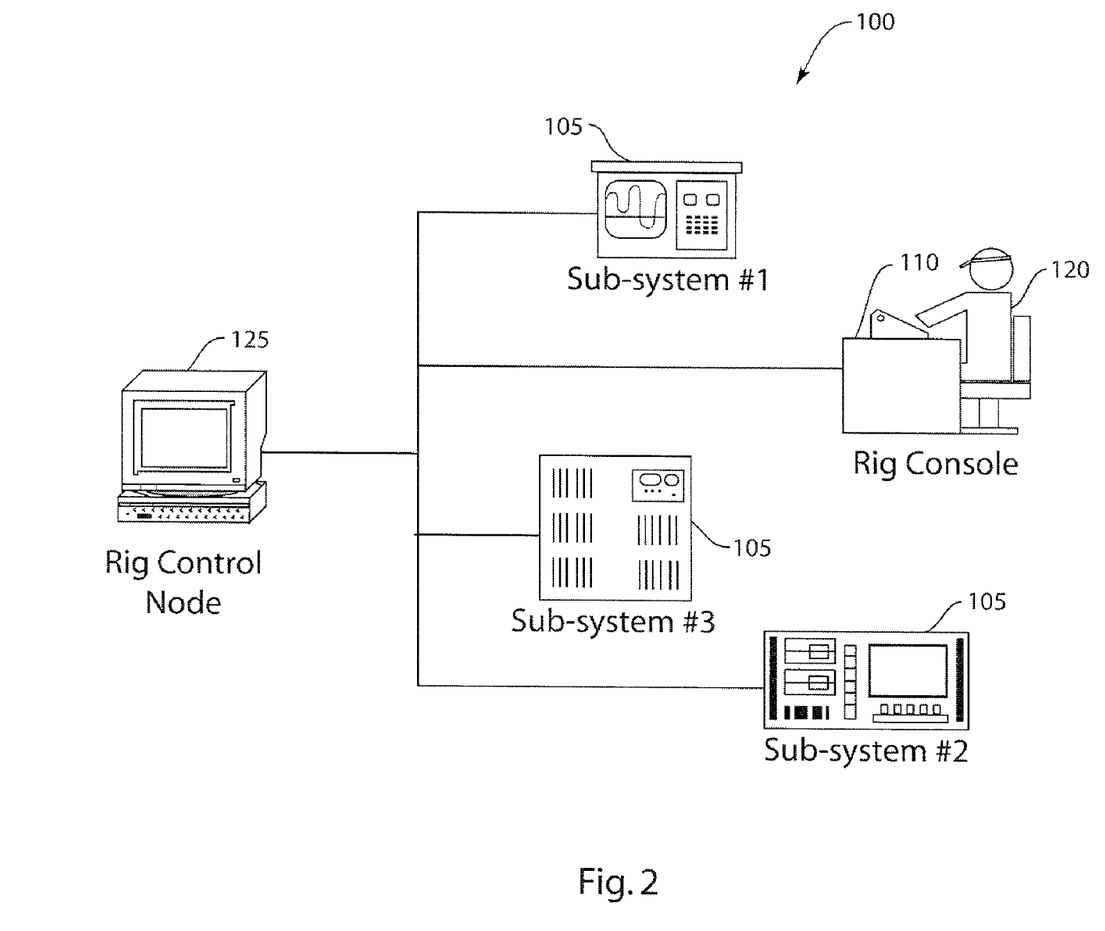
FIG. 2 illustrates an exemplary rig station according to an embodiment of the present application.

Referring to FIGS. 1 and 2 simultaneously, each rig station 100 includes a plurality of subsystems 105, a rig console 110 and a rig operator 120. The rig operator 120 may include, but is not limited to, a driller or other rig system operator. As discussed previously in the background, as drilling becomes more prolific and expensive, rig operator 120 may not be able to man each and every rig station 100 in any given rig control system architecture 50. Also, the rig console 110 includes user interfaces for each of the subsystems 105 in that particular rig station 100. As stated previously, it is likely that each subsystem 105 is manufactured and oftentimes installed by a separate and unique vendor. In other words, each subsystem will have different interface hardware and software, thus requiring a separate interface on the console 110 for the rig operator 120.

Still referring to FIGS. 1 and 2, the subsystems 105 include, but are not limited to, a number of subsystems 105 required by the particular rig station 100 such as the drilling rig control, a blowout preventer (BOP), a power plant, a top drive, and a hoisting system, to name a few. It is likely that any given rig station 100 includes approximately 5 to 15 subsystems 105. Again, each of these subsystems 105 is likely to have been manufactured by unique and separate vendors, having their own hardware, software and interface protocol.

As stated previously, each rig station 100 also includes a rig control node 125. Referring briefly to FIG. 3b, the rig control node graphical user interface 315 preferably includes a monitor 325, input/output devices such as a keyboard 340 and a mouse 345, and further has touch screen capabilities. The rig control node 125 is also equipped with a storage medium and a processor (not shown) in order to store and execute computer code to perform the functions that will follow in this application. Referring back to FIGS. 1 and 2, the rig control node 125 is in communication with the rig console 110 and the subsystems 105 such that the rig control node 125 replicates each of the user interfaces of each of the subsystems 105 that appears on the rig console 110. Again, these interfaces on the rig console 110 are presented to the rig operator 120 on separate pieces of hardware, using separate software applications, with separate controls. The rig control node 125 is configured such that all of the interfaces and controls are available to the rig operator 120, or as will be discussed later to a remote user, on one interface protocol, utilizing one piece of hardware and software. The rig control node 125 is configured to model the typical control panels that exist in the drilling rig, including but not limited to, monitoring control panels, feedback system control panels, actuator system control panels, and limit system control panels, associated with any of the subsystems 105.

Now referring to FIG. 1, in such a configuration, the rig operator 120 will be able to control the subsystems and view data from each of the subsystems 105 from the single rig control node 125 in the rig station 100. Furthermore, if the display of any given subsystem is changed on the rig control node 125 interface, that change will be replicated back to the interfaces on the rig console 110. The network 130 is preferably the SINET intranet currently utilized by Schlumberger, but may also be implemented through the use of any suitable, secured intranet, a secured internet connection, or other secured WAN or LAN networks configured to operate as described herein. This network 130 is coupled with a monitoring and data delivery system 135 having a storage medium and processor such that computer code may be stored and executed in the monitoring and data delivery system to effectuate the operation of the rig control system architecture 50. Preferably, the monitoring and data delivery system 135 is the Interact system, also manufactured and utilized by Schlumberger, but may also be any monitoring and data delivery system configured to operate as described herein.

Still referring to FIG. 1, operational support centers 140 are also connected with the network 130 such that remote viewing and operation of any rig control node 125 may be effectuated. Such remote viewing and operation of any rig control node 125, in turn, allows a remote driller (OSC Engineer 155) to view the operation or remotely operate any subsystem 105 of the rig station 100. The operational support centers (OSC) 140 include a remote control node 145. The terminal server is configured with a storage medium and processor such that computer code may be stored and executed in the remote control node 145 to effectuate the operation of the rig control system architecture 50. This allows the OSC client stations 150 to include graphical user interfaces and controls such that any rig control node 125 interface may be replicated in any of the OSC client stations 150.

In operation, any number of OSC engineers 155 are configured in an OSC 140, and may access any OSC client station 150 in order to monitor and/or operate any rig station 100 in the rig control system architecture 50. The above described network 130 connects the OSC client station 150 to a rig control node 125, as selected by the OSC engineer 155. The OSC engineer 155, through the OSC client station 150, is then able to view the operation, and/or control any of the subsystems 105 of that particular rig station 100 as the rig control node 125 of that rig station and its controls are replicated on the OSC client station 150. The OSC engineers 155 are able to access data and/or control any rig station 100 through the remote control node 145 or the rig control node 125. Typically, the OSC engineers 155 in the OSC 140 are available and trained to operate the actual drilling operations of the rig control system architecture 50 and its corresponding rig stations 100.

It should also be noted that any connection between the rig control node 125 and the network, and further between the network and either of the support centers 140, 142 may be any known wired connection suitable for use in the industry, or wireless connection suitably used in the industry as well.

Still referring to FIG. 1, maintenance support centers 142 may also be coupled with the network 130. In structure, the maintenance support center (MSC) 142 includes a remote control node 145 including a storage medium and processor. The MSC 142 also includes MSC client stations 150 that operate in the same manner as the OSC client stations 150, thus allowing maintenance support personnel 160 to monitor and operate subsystems 105 in any selected rig station 100 through the corresponding rig control node 125. While the MSC 142 in the figures is listed as a separate support center as the OSC 140, the two support centers, physically and logically, can operate as separate entities, or can be configured in one physical or logical location. The maintenance support personnel 160 includes personnel that is responsive to the maintenance issues of the particular rig stations 100, rather than the operational side as was discussed previously with respect to the OSC engineers 155. As shown in FIG. 1, the maintenance support personnel 160 include, but are not limited to, maintenance personnel such as a rig manager, a rig electrician, or a rig mechanic. The operation of the MSC 142 and the remote monitoring and operational functionality of the MS client stations 152 allow the maintenance support personnel 160 to monitor the proper function, and response of each of the subsystems 105 of any particular rig station 100. As with the operational support centers 140, the maintenance support personnel 160 of the maintenance support centers 142 are able to access data and/or control any rig station 100 through the remote control node 145 or the rig control node 125.

It should also be noted that the operational support centers 140 and maintenance support centers 142 can be combined and modified to include or exclude any number of personnel 155, 160, according to the needs of the client.

Figure 3A:
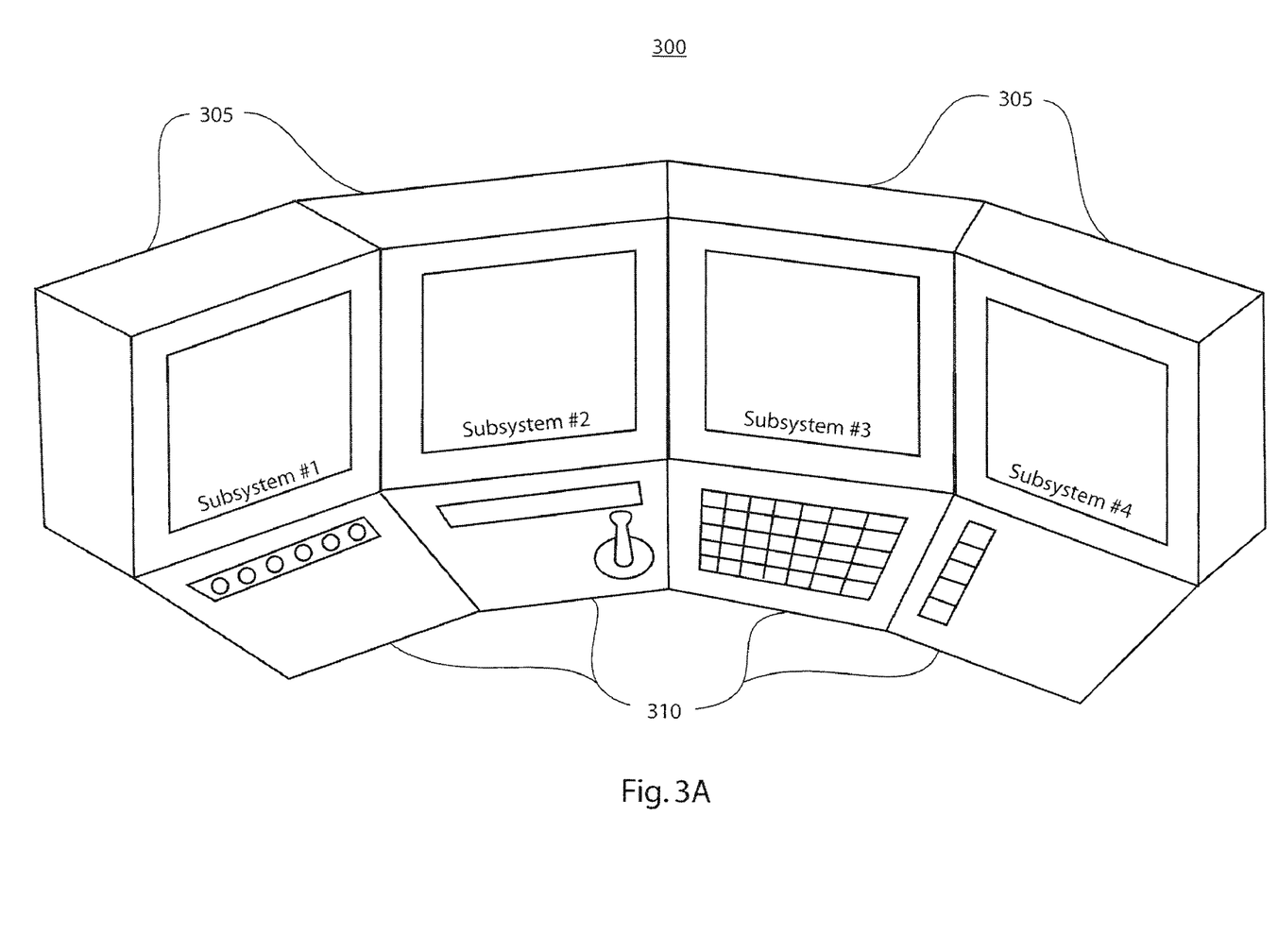
FIGS. 3*a* and 3*b* illustrate an exemplary graphical user interface of a rig console and a rig controller node, respectfully, of an embodiment of the present application.
Figure 3B:
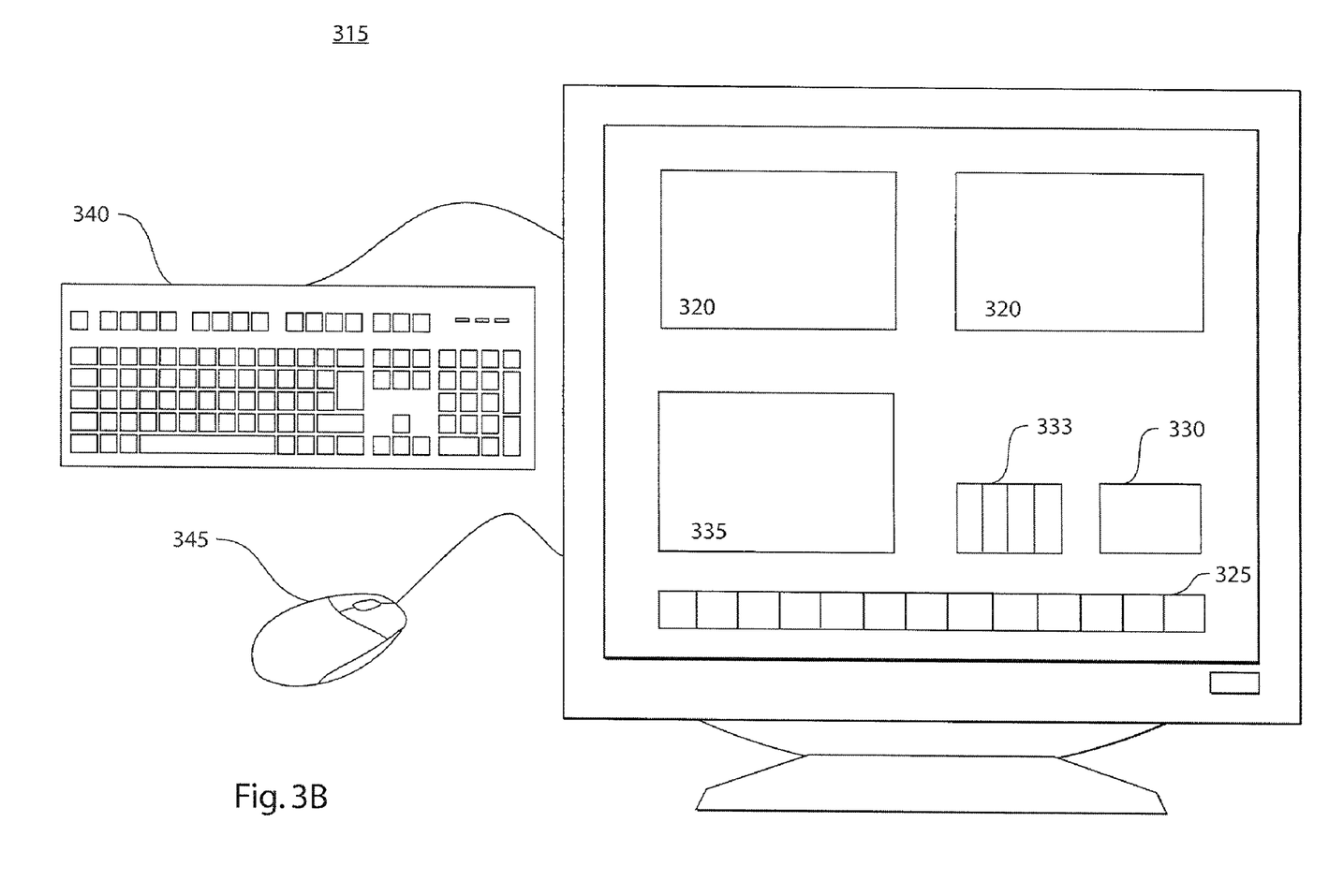

Referring now to FIG. 3A, a rig console graphical user interface configuration 300 is depicted. Referring briefly back to FIG. 2 and FIG. 3A simultaneously, the configuration 300 is an exemplary graphical model of what may be found in a typical rig console 110 of a rig station 100. It is this configuration 300, that lends to the problems associated with remote operation and monitoring that are solved through this disclosure. Here, the configuration 300 includes a plurality of subsystem graphical user interfaces 305 and corresponding subsystem controls 310. As one can see, each of the subsystem graphical user interfaces 305 are labeled with a particular subsystem number to illustrate that each subsystem 105 in any given rig station 100 requires a separate hardware and software system in order to allow the rig operator 120 to monitor and control each subsystem 105.

Still referring to FIG. 3A and FIG. 2 simultaneously, if the rig operator 120, while monitoring all four subsystems with the appropriate subsystem graphical user interfaces 305, wanted to adjust the operation of the subsystem 1, e.g., a power plant, then the rig operator 120 would utilize the appropriate controls 310 associated with that subsystem. The rig operator 120 would likewise be required to adjust the settings of a drilling rig control subsystem of subsystem 3 for instance by utilizing those separate controls 310. In the prior art, one can now see that in order to remotely control a rig station 100 having such a configuration 300, each remote monitoring and control configuration would require the configuration 300 as depicted in FIG. 3A, as each of the subsystems would require the graphical user interface and control configuration, 305 and 310, respectively, shown in FIG. 3A.

In order to more easily implement remote monitoring and control of any given rig station 100, the rig control nodes 125 of the rig control system architecture 50 replicate each subsystem graphical user interface 305 of the configuration 300 in FIG. 3A into a rig controller node graphical user interface 315. This graphical user interface 315 preferably includes a monitor 350, a keyboard 340 and a mouse 345, with the monitor 350 having touch screen capabilities. However, it should be noted that the graphical user interface 315 merely requires the appropriate input/output devices to view and manipulate the subsystem displays 20 that are replicated from the rig console 110 in the rig station 100. Still referring to FIG. 3B, the graphical user interface 315 depicted here illustrates one exemplary embodiment of how the graphical user interface 315 may display the subsystem displays 320, and accompanying configuration selector, subsystem menu, and/or algorithm control 335. In this embodiment, the graphical user interfaces of the subsystems are displayed on the node graphical user interface 315, and are selectable using the subsystem menu 325. In other words, the subsystem menu 325 includes labels for all available subsystems on any given rig, as chosen by a user with the rig selector 333. A configuration selector 330 may be included in the graphical user interface 315 in order to provide a user with choices for the layout of the graphical user interface 315, including arranging the subsystem menu 325 vertically or horizontally, hiding the rig selector 333, or other elements such as the algorithm control 335. The algorithm control 335 allows a user to control, select, modify, record or play back algorithms on any of the subsystems, as will be discussed in further detail below.

In operation, a user may utilize the keyboard, mouse 345 and touch screen capabilities of the monitor 350 to view, and/or control any of the subsystems through the subsystem displays 320. Again, the user may select a particular rig with the rig selector 333, and what subsystem displays 320 of that particular rig be displayed using the subsystem menu 325. This monitoring and control can be effectuated by a user locally in the rig station 100 by utilizing this graphical user interface 315 at the rig control node 125, or at any of the OSC client stations 150, MSC client stations 152, or remote control nodes 145, as described previously. Again, this graphical user interface 315 is exemplary, and may be modified as desired to fit a particular user's specification. What is preferred in that the subsystem display 320 for all of the subsystems in a rig are accessible to a user, and allow the user to monitor and operate each subsystem.

Figure 4:
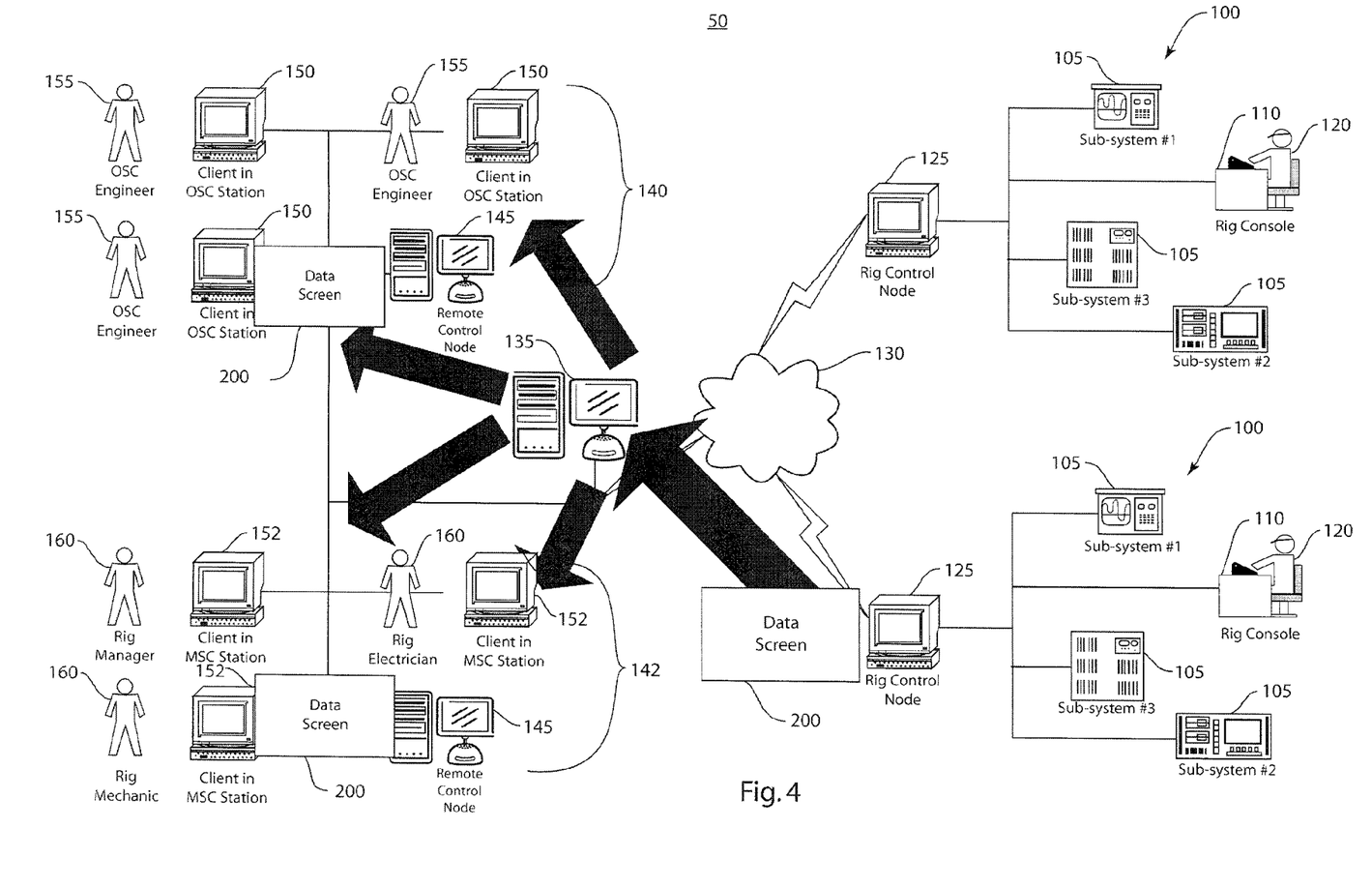
FIG. 4 illustrates an exemplary control system architecture according to an embodiment of the present application.

FIG. 4 illustrates the rig control system architecture 50 of the present application, and further illustrates how a data screen 200 from a particular rig control node 125 is distributed to the various OSC client stations 150, MS client stations 152 and remote control nodes 145 throughout the architecture 50. The architecture 50 is configured such that the rig control nodes 125 may be utilized for data monitoring of the subsystems 105 of the rig stations 100. In other words, the data screens on the rig console, which may include data screens for a particular subsystem 105, or a data screen summarizing overall operation of the rig station 100 may be replicated on the rig control node 125 or remote control nodes 145, and monitored remotely in either of the OSC 140 or MSC 142 on any of the client stations 150, 152. The specific example set forth in FIG. 4 illustrates how the rig control node 125 sends in the direction of the arrow the data screen 200, through the network and monitoring and data delivery system 135, and to each remote station 150, 152. This allows the data screen 200 to be viewed at any of the remote stations 150, 152, where such monitoring does not require an OSC engineer 155 or MS personnel 160 to reply to the particular rig station 100 with instructions or control instructions.

Figure 5:
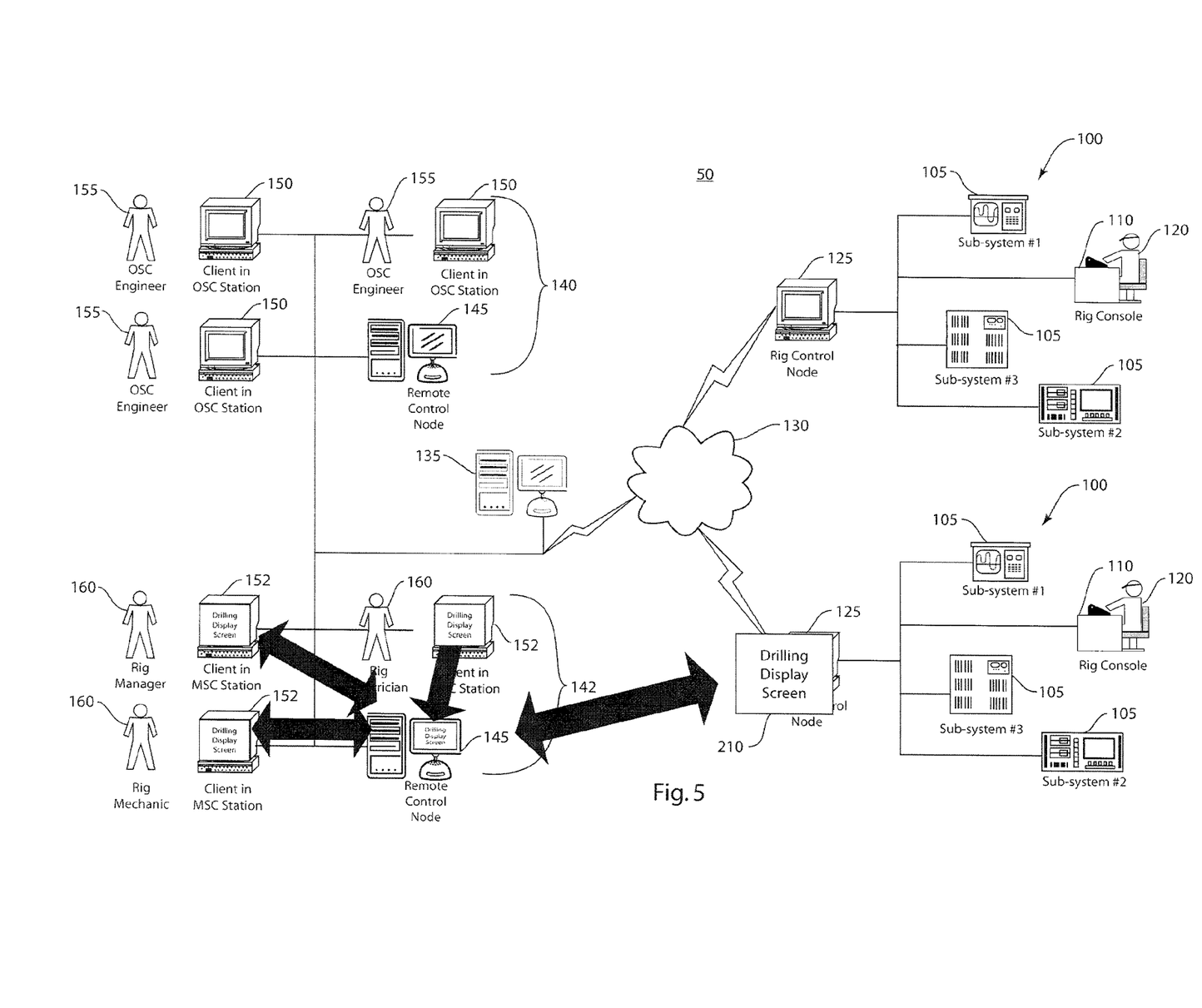
FIG. 5 illustrates an exemplary control system architecture according to an embodiment of the present application.

FIG. 5 illustrates the drilling display replication functionality of the present application. Here, the drilling subsystem 105 and accompanying display and controls, is utilized to illustrate how any of the subsystems 105 are controlled remotely from the OSC client stations 150 or MSC client stations 152 or rig control node 125. Again, the control graphical user interface of the particular subsystem 105 from the rig console 110 is replicated at the rig control node 125. The drilling display screen 210 is replicated the remote control node 145 where it is accessible to the various client stations 150, 152. It should be noted that in the control functionality, the arrow indicating the drilling display screen 210 being replicated in the remote control node 145 and associates MSC client stations 152 is a two-way arrow. This indicates that the MS personnel 160 may utilize a set of controls on the graphical user interface at the MSC client station 152 ore remote control node 145 in order to control the associated subsystem 105 remotely. Again, it should be noted that this figure is an exemplary illustration of remote replication and control of any of the subsystems 105. The replication and control of these subsystems 105 can be made to and carried out from the rig control node 125 corresponding to that subsystem 105, or at any of the client stations 150, 152 in either the OSC 140 or MSC 142.

Figure 6:
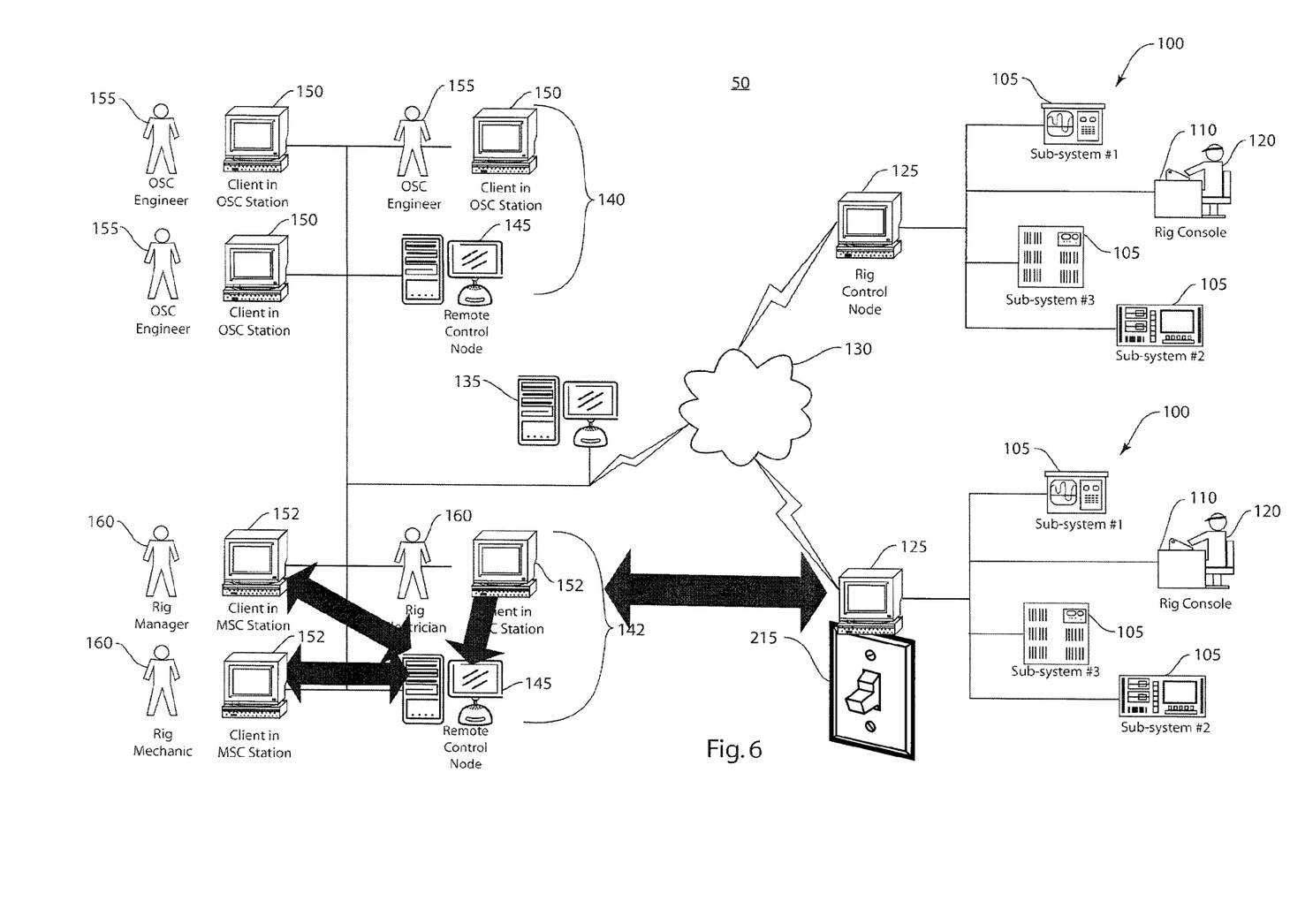
FIG. 6 illustrates an exemplary control system architecture according to an embodiment of the present application.

Conceptually, the architecture diagram in FIG. 6 illustrates power control 215 functionality of the architecture 50. Again, as with FIG. 5, the architecture 50 allows the power control 215 of any of the subsystems 105 in the architecture 50 to be replicated and controllable from the rig control node 125 or remote control node 145 corresponding to the subsystem 105, or any of the remote client stations 150, 152.

Figure 7:
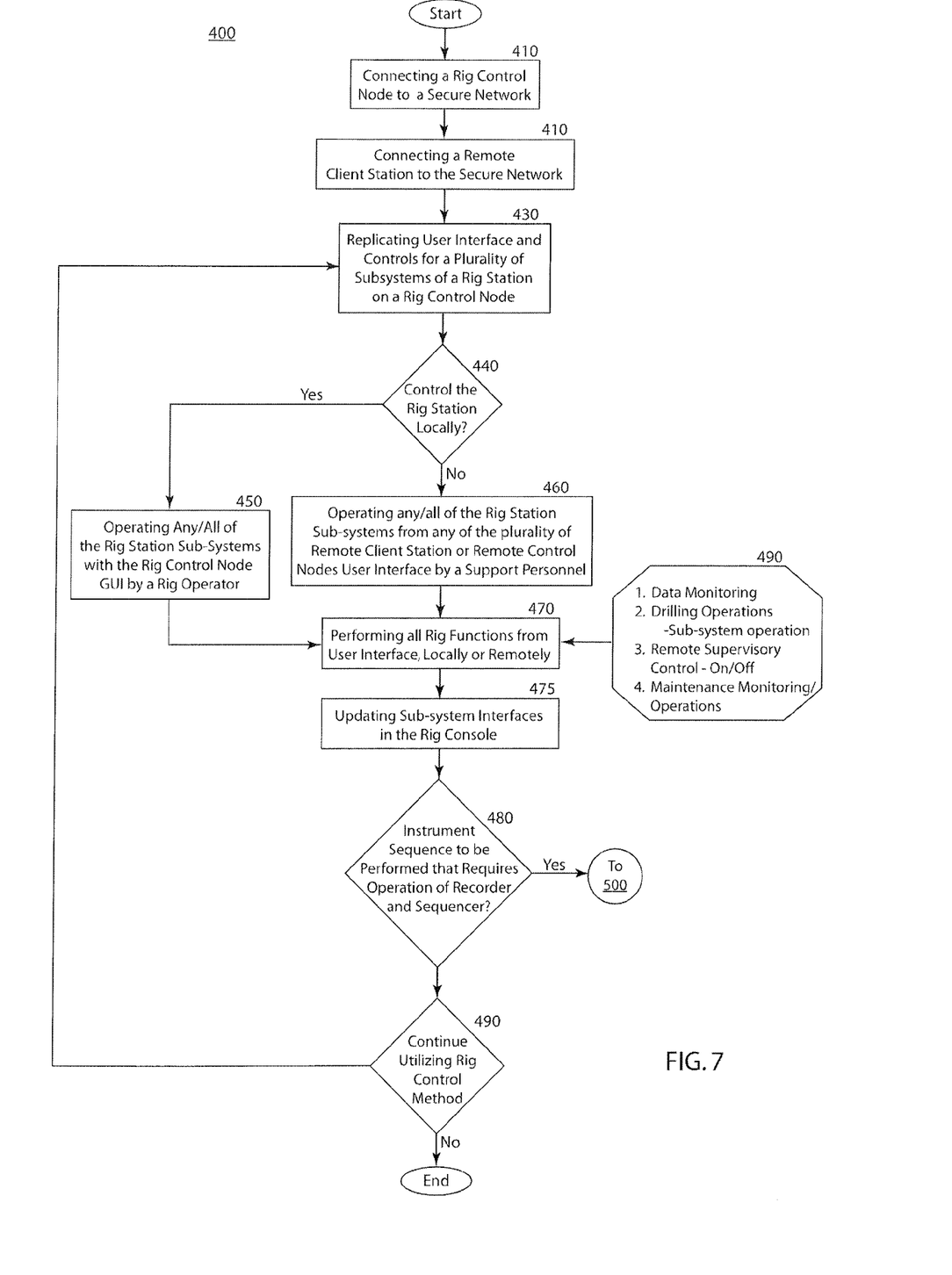
FIG. 7 illustrates a method according to an embodiment of the present application.

FIG. 7 illustrates a method 400 of rig monitoring and supervisory control according to the present application. In step 410, the rig control nodes are connected with a secure network. As stated previously with respect to the description of the architecture, the secure network may be an intranet network, secured internet connection, or any secured LAN or WAN network. In step 420, at least one remote client station is connected with the secure network. Again, as described above, operational support centers as well as maintenance support centers having support or maintenance personnel may be grouped separately and connected to the network, or configured as one large remote access station to the rig stations or plurality of rig stations. In step 430, the user interface and controls of a plurality of subsystems of a rig station are replicated on a rig control node. For a system that includes a plurality of rig stations, each rig station has a corresponding rig control node and that rig control node replicates the user interfaces and controls for each of the subsystems within that rig station. If the rig stations are to be controlled locally in step 440, then a rig operator may operate any or all of the rig station subsystems by utilizing the graphical user interface and controls of the rig controller node corresponding to that rig station. If remote access and control to the rig stations is desired at step 440, then any or all of the rig station subsystems are operated and maintained by the operational and maintenance personnel with any of the plurality remote client stations or remote control nodes. The support personnel utilize the user interfaces and controls accompanying the remote client stations.

Still referring to FIG. 7, all rig functions may be performed, either locally or remotely utilizing the replicated user interface that either the rig control node or the remote client stations as discussed above, respectively in step 470. The rig functions 490 include, but are not limited to data monitoring, drilling operations and subsystem operations, remote supervision control, including power control of the subsystems, and maintenance monitoring and operations. Again, these operations and rig functions are discussed above with respect to the architecture. In step 475, when the rig functions are performed locally at the rig control node, or remotely at any of the client stations, the subsystem interfaces in the rig console are updated, such that a driller at the rig console can see the current state of any of the subsystems operations or monitoring. In step 480 if an instrument sequence is to be performed that requires operation of the recorder and sequencer of the application, then the method moves to the operation and sequencer method 500 of FIG. 8. In any case, in step 490, if the rig control method is no longer required, then the method ends. However, the rig control method returns to step 410 if still required and the replication of the user interface and controls continue.

Figure 8:
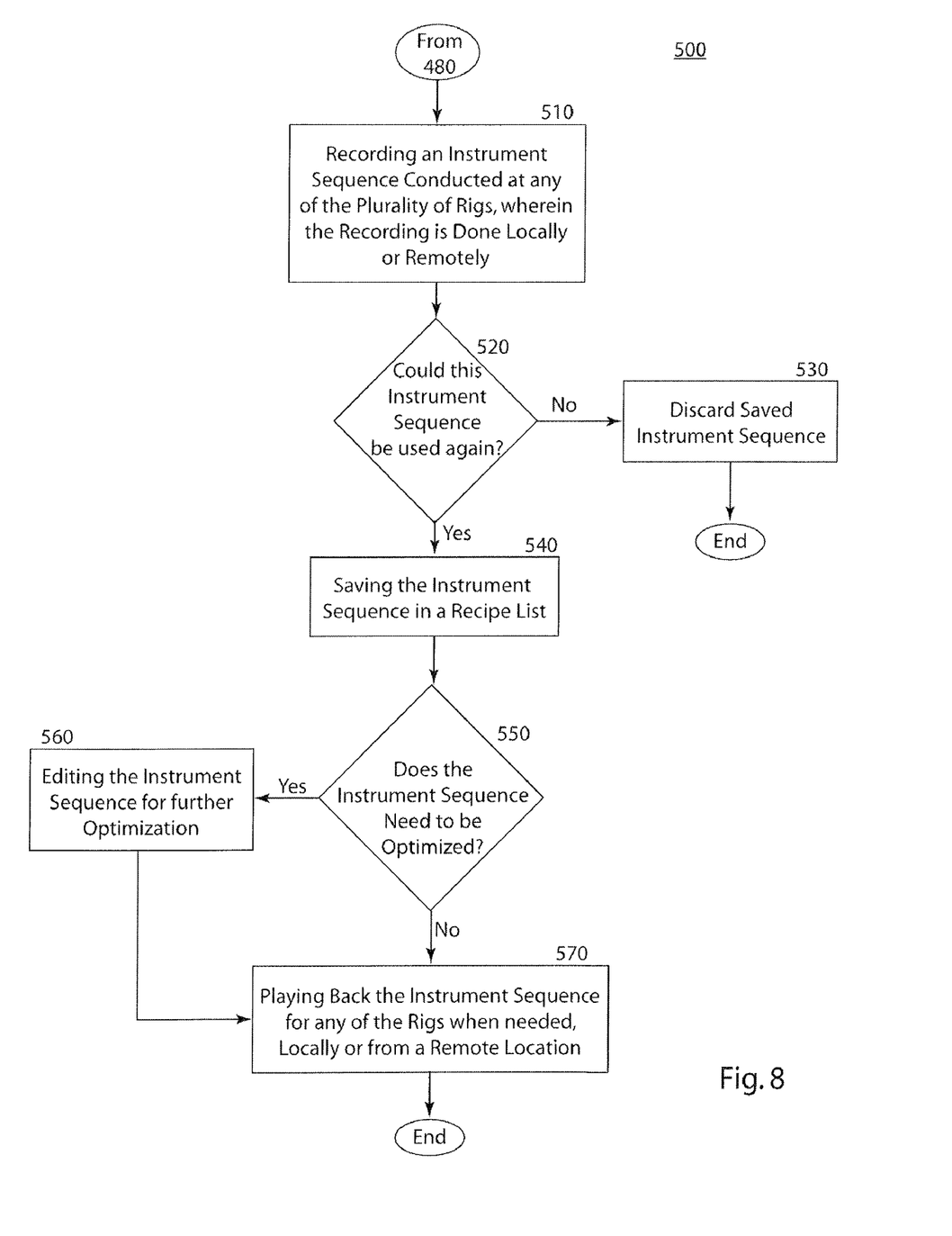
FIG. 8 illustrates a method according to an embodiment of the present application.

FIG. 8 illustrates a recorder and sequencer method 500 of the present application. This method 500 includes functionality which can be used to record particular instrument sequences over time, and further includes the ability to modify and playback the exact sequence repeatedly. In step 510, an instrument sequence conducted at any of the plurality of rigs is recorded, wherein the recording is done locally or remotely. It should be noted that an instrument sequence in this case includes any manual and/or automatic subsystem sequence that is used to control any of the subsystems alone or in combination in any fashion. For instance, an important sequence may include a directional drilling sequence, a downlinking sequence, or a rotary system sequence, to name a few.

Once any sequence is recorded in step 510, it is determined whether this sequence may be used again or is an important sequence for the operation of the architecture 50. If not, then the saved instrument sequence is discarded in step 530 and the method ends. If so, then the sequence is saved in a recipe list in step 540. The recipe list may be saved on any of the storage mediums disclosed above, or may be saved externally in a separate storage medium (not shown). The recipe list may be accessible from any of the remote client stations or the rig control node. In 550, if the sequence needs to by optimized, then in step 560 the instrument sequence is edited for further optimization, again at any of the remote client stations or the rig control node. And if no optimization is needed in step 550, then the instrument sequence is played back for any of the rigs when needed, locally or from a remote location. It should be noted that alternatively that the method may be utilized such that a sequence being added to the recipe list in step 540 may not be originated from a sequence carried out by an operator of the rig. That is, a sequence may be actually written or created by a rig controller or other personnel, and be saved to the recipe list for future use. In other words, sequences may be recorded, edited, and played back at appropriate times, or may be written or created, edited, and played back at selected times.

As an example, if a driller in rig 1 is performing a downlinking operation, the sequence of the driller's operations may be recorded from the rig control node, or from any remote client station in the system. Simplifying the downlinking operation, it is actually a sequence of pumping fluid change in a particular rig. Basically, the driller is required to pump at a certain rate for a determined amount of time, and then change the pumping rate for another determined amount of time. This series of changes in pumping rates over predefined periods of time may be combined with moving the drilling subsystem as well. If a particular driller is very proficient at this sequence, the OSC personnel may wish to record it and use it at other rigs. Therefore, once the operations of that particular driller are recorded performing the downlinking sequence, that sequence is saved in the recipe list, and any OSC or MSC personnel may review the sequence and make the appropriate edits to optimize the sequence further, thus maximizing the efficiency of that particular sequence. By remote or local operation, any driller or personnel may select from the recipe list this optimized downlinking sequence to be performed on any of the rigs in the architecture.

The present disclosure has been described in terms of specific embodiments incorporating details to facilitate the understanding of the principles of construction and operation of the disclosure. Such reference herein to specific embodiments and details thereof is not intended to limit the scope of the claims appended hereto. It will be apparent to those skilled in the art that modifications may be made in the embodiment chosen for illustration without departing from the spirit and scope of the disclosure.

What is claimed is:
1. A rig control system, the system comprising:
a rig station including a plurality of subsystems, the rig station further including:
a rig console having a graphical user interface and control for each of the plurality of subsystems, wherein each graphical user interface and control has a unique operating protocol; and a rig control node, the rig control node including a single graphical user interface and control for monitoring and operating the plurality of subsystems with a common operating protocol, wherein the single graphical user interface concurrently displays a plurality of subsystem displays, wherein each subsystem display is associated with a subsystem among the plurality of subsystems;

a remote client station coupled to the rig station over a secure network wherein the single graphical user interface and control of the rig control node is accessed through the secure network and replicated on the remote client station, such that each substation of the rig can be monitored and operated by a user from the remote client station or the rig control node;

a storage medium configured to store a set of executable code; and a processor configured to execute the set of executable code, wherein when the set of code is executed, the monitoring and operation of the system is effectuated.

2. The system of claim 1, further comprising an operational support center including a plurality of remote client stations and a terminal server, wherein the terminal server is configured to include the storage medium and the processor configured to store the set of executable code and execute the same.

3. The system as claimed in claim 2, further comprising a maintenance support center including the plurality of remote client stations and the terminal server, wherein the maintenance support center is physically separate from the operational support center.

4. The system as claimed in claim 3, wherein the maintenance support center is physically configured in the same location as the operational support center.

5. The system as claimed in claim 1, further comprising a monitoring and data delivery system coupled with the network, the monitoring and data delivery system including the storage medium and the processor, and configured to effectuate one-way communication of a set of monitoring data from the rig control node to the remote client station.

6. The system as claimed in claim 1, wherein when a user accesses the remote client station to operate any one of the plurality of subsystems, an operational control communication effectuated through the network is bi-directional.

7. The system as claimed in claim 1, wherein the secure network can be any one of the following: an intranet, the internet, a local area network, and a wide area network.

8. The system as claimed in claim 1, wherein the remote client station and the rig control node are configured to record, modify, and playback an operation sequence carried out by a rig operator.

9. A method of rig monitoring and supervisory control, the method comprising:
    connecting a rig control node to a secure network;
    connecting a remote client station to the secure network;
    replicating a user interface and control for each of a plurality of subsystems of a rig station from a rig console onto a single user interface of the rig control node, wherein the single user interface concurrently displays a plurality of subsystem displays, wherein each subsystem display is associated with a subsystem among the plurality of subsystems;
    accessing the single user interface from the remote client station through the secure network;
    operating any of the plurality of subsystems by a user from the remote client station; and
    updating the user interface for each of the plurality of subsystems in response to the operating step.

10. The method as claimed in claim 9, further comprising operating any of the subsystems by a user from the rig control node.

11. The system as claimed in claim 9, further comprising monitoring a set of data from any of the plurality of subsystems from the remote client station or the rig control node.

12. The method as claimed in claim 9, wherein the monitoring step is effectuated by a monitoring and data delivery system coupled with the network, wherein the monitoring and data delivery system is configured to effectuate a one-way communication of monitoring data from the rig control node to the remote client station.

13. The method of claim 9, further comprising providing remote supervisory control for any of the plurality of subsystems from the remote client station.

14. The method of claim 9, further comprising providing maintenance monitoring and operational control for any of the plurality of subsystems from the remote client station.

15. The method as claimed in claim 9, further comprising configuring a plurality of remote client stations into a support center, the support center including a terminal server.

16. The method as claimed in claim 9, wherein when the remote client station is utilized by a user to perform the operating step, the operational control communication effectuated through the network occurs bi-directionally.

17. The method as claimed in claim 9, wherein the secure network can be any one of the following: an intranet, an internet, a local area network, and a wide area network.

18. The method as claimed in claim 9, wherein method further comprises:
    recording an operation sequence carried out by a driller operating the rig console;
    modifying any portion of the operation sequence; and
    playing back the operation sequence on any rig station, wherein any of the steps can be carried out at the remote client station or the rig control node.

19. A method of rig automation control, the method comprising:
    replicating a user interface and control for each of a plurality of subsystems of a rig station from a rig console onto a single user interface of a rig control node;
    accessing the single user interface from a remote client station through a secure network;
    recording an instrument sequence conducted by a driller at the rig station;
    saving the instrument sequence to a recipe list;
    editing the instrument sequence to optimize the efficiency of the instrument sequence; and
    playing the instrument sequence back at the rig station.

20. The method as claimed in claim 19, wherein the recording, saving, editing and playing back steps can be carried out from the remote client station or the rig control node.

21. The method as claimed in claim 19, further comprising writing an instrument sequence in lieu of the recording step.

* * * * *